(12) United States Patent
Chang

(10) Patent No.: US 7,349,448 B2
(45) Date of Patent: Mar. 25, 2008

(54) DISTRIBUTED MULTIPLEXING CIRCUIT WITH BUILT-IN REPEATER

(75) Inventor: Edward Chang, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1000 days.

(21) Appl. No.: 10/632,885

(22) Filed: Aug. 1, 2003

(65) Prior Publication Data

US 2005/0025196 A1 Feb. 3, 2005

(51) Int. Cl.
*H04J 3/04* (2006.01)

(52) U.S. Cl. .................................... 370/535

(58) Field of Classification Search ............ None
See application file for complete search history.

(56) References Cited

U.S. PATENT DOCUMENTS

| | | | |
|---|---|---|---|
| 4,596,004 A | 6/1986 | Kaufman | |
| 5,677,638 A | 10/1997 | Young et al. | |
| 5,748,033 A | 5/1998 | Kaveh et al. | |
| 5,905,665 A | 5/1999 | Rim | |
| 5,936,424 A | 8/1999 | Young et al. | |
| 6,288,418 B1 | 9/2001 | Reed et al. | |
| 6,415,353 B1* | 7/2002 | Leung | 711/106 |
| 6,937,499 B2* | 8/2005 | Nordal et al. | 365/145 |
| 7,023,844 B2* | 4/2006 | Wolrich et al. | 370/388 |
| 7,209,383 B2* | 4/2007 | Dray et al. | 365/171 |

FOREIGN PATENT DOCUMENTS

| | | |
|---|---|---|
| EP | 0 492 862 A2 | 1/1992 |
| EP | 0492862 B1 | 7/1997 |
| EP | 0866632 A2 | 9/1998 |
| GB | 1483903 | 9/1974 |
| GB | 1 483 903 | 8/1997 |

OTHER PUBLICATIONS www.ece.msstate.edu/~reese/EE3714/combblocks/combblocks.pdf, "Combinational Building Blocks", pp. 1-6.

* cited by examiner

*Primary Examiner*—Andrew C. Lee

(57) ABSTRACT

A multiplexor circuit comprising a plurality of data connections, first stage logic configured to receive a first data word from one of the connections and to transmit the first data word received, and second stage logic configured to receive the first data word from the first stage logic and to select a selected data word between the first data word and a second data word received from another of the plurality of data connections based upon a set of select signals, the second stage logic configured to transmit the selected data word.

21 Claims, 7 Drawing Sheets

DISTRIBUTED MULTIPLEXING CIRCUIT WITH BUILT-IN REPEATER

BACKGROUND

A standard multiplexor (MUX) circuit is used to select one signal from multiple signals. More specifically, a standard MUX circuit can be implemented on an integrated circuit (IC) and used to select data from a particular one of a plurality of data connections.

For example, a MUX circuit within an IC may comprise eight data connections that transmit 128-bit data words. Typically, each of the 128-bit data words may be routed to multiplexor logic on the IC via a connection that comprises 128 routing wires, e.g., a wire for each bit that is transmitted. Therefore, in this particular example, 1024 routing wires on the IC would be used to route eight data words from eight data connections to the multiplexor logic. The multiplexor logic selects and outputs one of the 128 bit words received by the multiplexor logic. Notably, the aforedescribed MUX circuit is prone to routing congestion and the inherent problems associated therewith, e.g., difficulty in designing and fabricating.

A conventional MUX circuit 100 is depicted in FIG. 1. The MUX circuit 100, of FIG. 1 comprises an array of data connections 102-105 (e.g. data ports, etc.) and multiplexor logic 110. During operation, each data connection 102-105 transmits a 128-bit data word to multiplexor logic 110 via 128-bit wide data connections 112-115, respectively.

The multiplexor logic 110 receives the data words and, at any given time, selects one of the data words on one of the connections 112-115 based on a control signal from MUX control logic 109. The MUX logic 110 transmits the selected data word via an output connection 126, to an IC component, such as a system bus 124. The MUX design depicted by FIG. 1 employs a significant number of routing wires, and the number of routing wires increases as the number of data connections increases.

In the past, dynamic MUXs and tristate MUXs have been employed in an attempt to address routing congestion caused by large numbers of routing wires. However, a dynamic MUX typically requires more power, has smaller noise margins, and takes more time to design correctly. Further, usage of tristate multiplexors is sometimes acceptable when the distances between the data connections 102-105 and the multiplexor logic 110 are small. However, speed and noise degradation typically increases as the distances between the data connections increase.

SUMMARY OF THE DISCLOSURE

Embodiments of the present disclosure pertain to systems for distributing multiplexor functionality. One such embodiment is a system that comprises a plurality of data connections and first stage logic configured to receive a first data word from one of the connections and to transmit the first data word received. Further, the system comprises second stage logic configured to receive the first data word from the first stage logic and to select a selected data word between the first data word and a second data word received from another of the plurality of data connections. Further, the second stage logic selects the selected data word based upon a set of select signals and transmits the selected data word.

Another embodiment of the present disclosure comprises a method for distributing multiplexor functionality. One such method comprises the steps of receiving a first data word corresponding to a first data connection, transmitting the first data word to first logic associated with a second data connection, selecting a selected data word via the first logic between the first data word and a second data word transmitted from the second data connection based upon a set of select signals, and transmitting the selected data word.

BRIEF DESCRIPTION OF THE DRAWINGS

The invention can be better understood with reference to the following drawings.

DETAILED DESCRIPTION

Generally, embodiments of a distributed multiplexor circuit select between multiple data connections, each of which is separated from multiplexor logic by some distance on an integrated circuited (IC). Each data connection is preferably capable of transmitting an n-bit data word, where "n" refers to the number of bits within the data word. The n-bit data word is transmitted via a connection that comprises at least n routing wires wherein each different bit of the n-bit word is transmitted via a different routing wire. A set of bits, e.g. 128 bits simultaneously transmitted from the same data connection, is hereinafter referred to as a "data word." Preferably, each data connection transmits its data word to a distributed multiplexor logic (DML) stage that is associated with the data connection, and select logic then indicates which data word from the multiple data connections is to be output (e.g. transmitted to a discrete IC component).

Each DML stage is one of a plurality of consecutive stages. A first stage in the plurality of consecutive stages preferably receives the data word from its associated data connection. Each of the remaining stages receives a data word from its associated data connection and a data word from a previous stage.

Select logic transmits a set of select signals to each DML stage, and the select signals are indicative of which data word is to be selected for further transmission. In accordance with these select signals, each DML stage selects either the data word it receives from a previous DML stage, if any, or the data word it receives from its associated data connection. In the final stage of the plurality of consecutive stages, the distributed multiplexor circuit drives the resulting selected data word indicated by the select logic onto the system bus or some other type of conductive connection.

Figure 1:
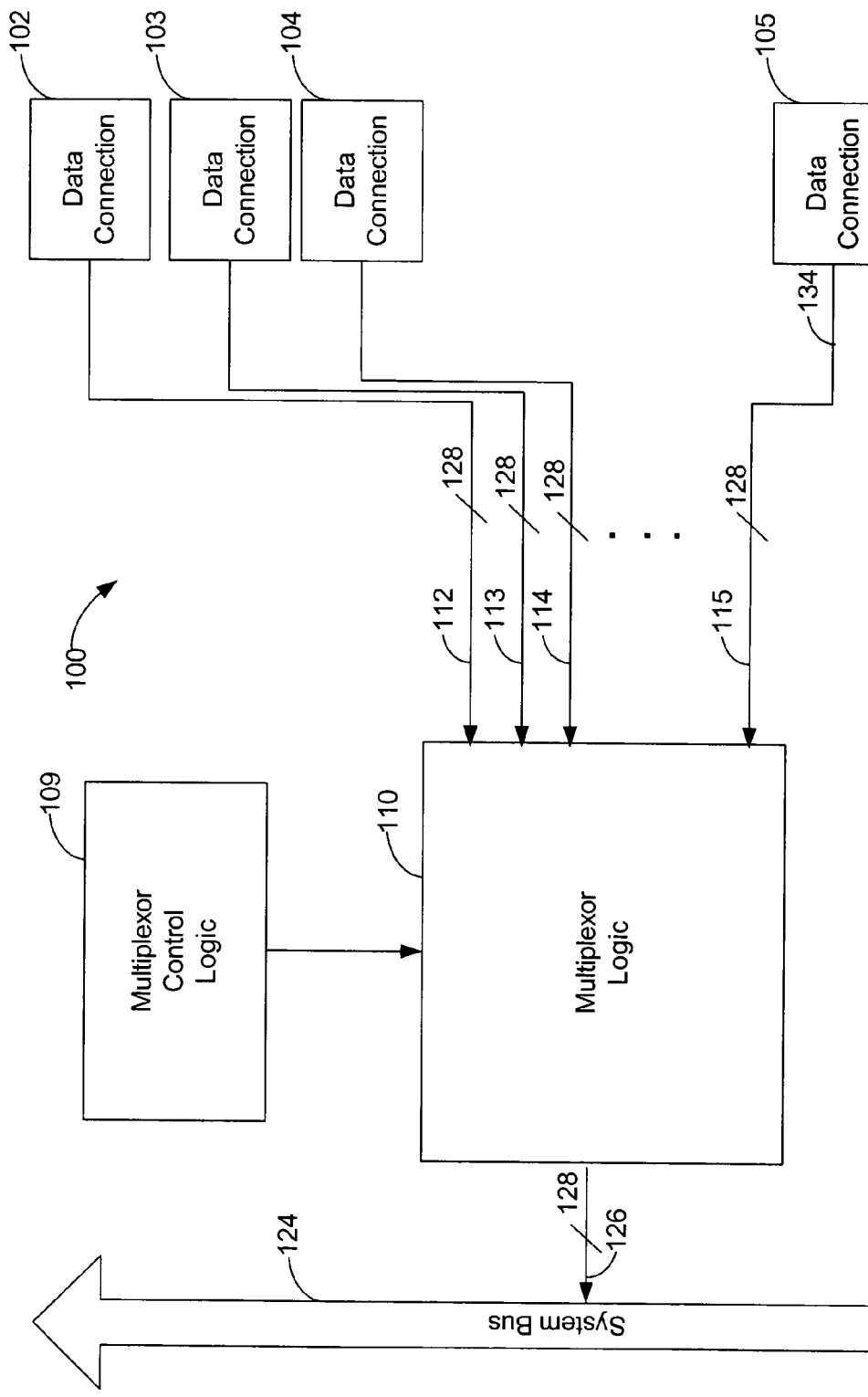
FIG. 1 is a block diagram illustrating a conventional multiplexor.
Figure 2:
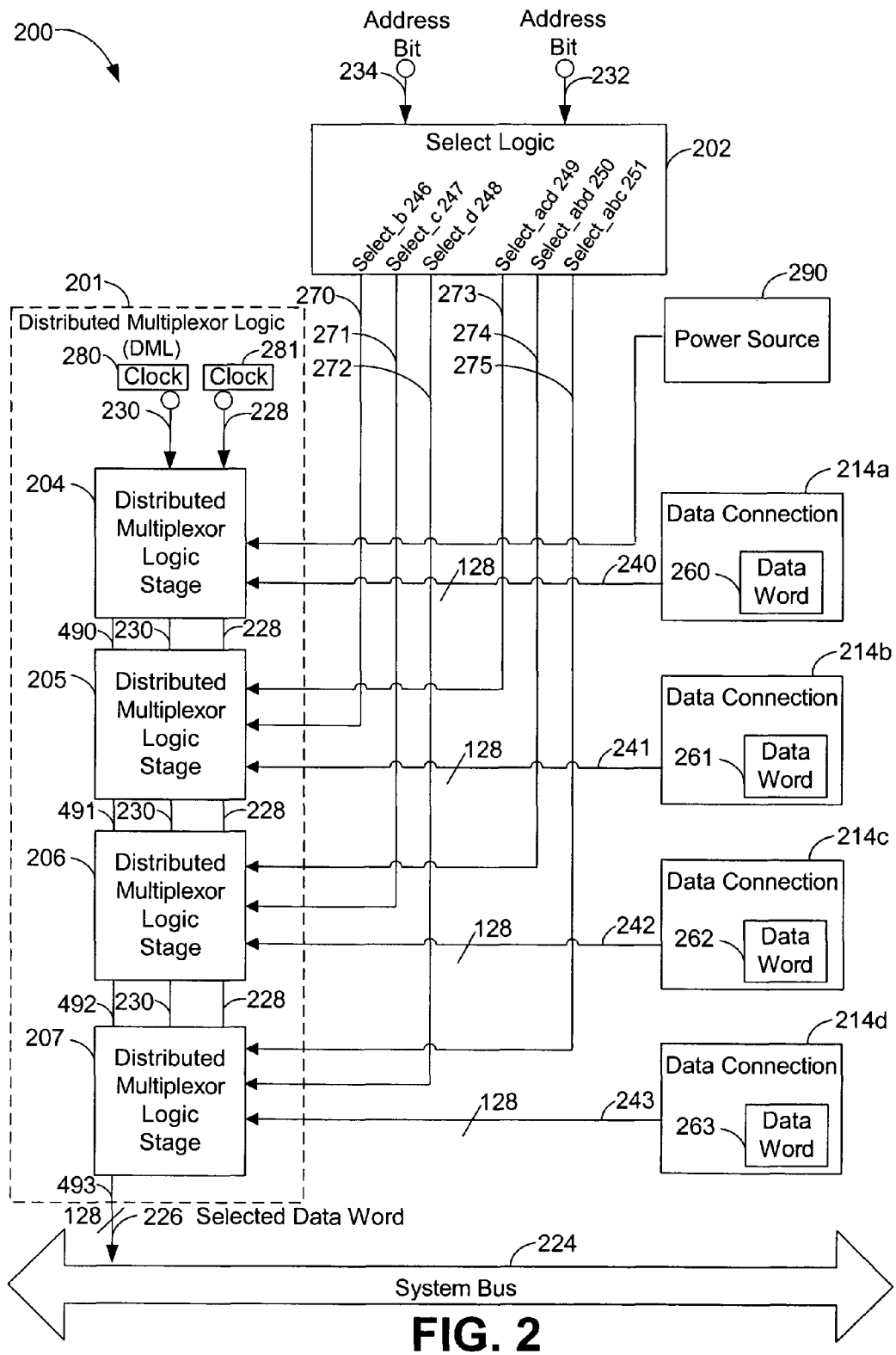
FIG. 2 is a block diagram illustrating an exemplary embodiment of a distributed multiplexing system of the present disclosure.

FIG. 2 is a block diagram illustrating a distributed multiplexor circuit 200 in accordance with an exemplary embodiment of the present disclosure. The distributed multiplexor circuit 200 comprises select logic 202 and DML 201. The circuit 200 further comprises a plurality of data connections 214a-214d, and for brevity and clarity, the multiplexor circuit 200 shall be described hereafter as comprising four data connections, data connections 214a, 214b, 214c, and 214d. However, other numbers of data connections may be employed in other embodiments.

The DML 201 comprises a plurality of stages 204-207, preferably corresponding to the number of data connections, from which a selected data word is chosen and transmitted via connection 226. In a preferred embodiment, the DML 201 comprises a number of stages 204-207 equal to the number of data connections 214a-214d, although other variations in the number of data connections and stages are possible in other embodiments. Thus, the DML 201 of FIG. 2 comprises four stages 204-207, one stage for each data connection 214a-214d. In this regard, logic 201 of circuit 200 comprises DML stages 204, 205, 206, and 207 associated with data connections 214a, 214b, 214c, and 214d, respectively.

During operation of circuit 200, DML stage 204 receives a data word 260 transmitted via a connection 240, from data connection 214a. As described herein, the width of each connection 240-243 corresponds to the width of the data word transmitted by its associated data connection. For example, if data connection 214a transmits a data word that is 128 bits wide, then the connection 240 is preferably comprised of 128 routing wires through which each of the 128 bits of the data word 260 is transmitted. Likewise, DML stage 205 receives a data word 261 transmitted via data connection 241 from data connection 214b, DML stage 206 receives a data word 262 transmitted via connection 242 from data connection 214c, and DML stage 207 receives a data word 263 via connection 243 from data connection 214d.

Moreover, the select logic 202 is communicatively coupled to the DML 201 via routing wires 270-275, and transmits a plurality of select signals 246-251 via these routing wires 270-275 to the DML 201, respectively. The select signals 246-251 indicate which of the data words from data connection 214a-214d, is the "selected data word" that is to be output from the DML 201 and transmitted, via connection 226, to a system bus 224. Note that the select logic 202 may be implemented in a variety of ways, and one such implementation is described in detail hereinafter with reference to FIG. 3.

In the course of operation, the distributed multiplexor circuit 200 depicted in FIG. 2 receives two input bits, address bit 234 and address bit 232. Note that other numbers of address bits may be employed in other embodiments depending upon the number of data connections from which the circuit 200 selects a selected data word for transmission to connection 226. Preferably an application (not shown) requests data from a particular one of the data connections 214a-214d. In so requesting, the application transmits two address bits 232 and 234 having values identifying the data connection 214a-214d from which the application seeks data. For purposes of illustration, the application may assert both address bit 234 and address bit 232, thereby identifying data connection 214b. In response, select logic 202 may assert and/or deassert appropriate select signals to effectuate transmission of data word 261 to the system bus 224 via connection 226.

The select logic 202 asserts select signals 246-251 in accordance with the data connection 214a-214d indicated by the address bits 234 and 232. In particular, the select logic 202 asserts the data connection select signal 246-248 corresponding to the particular data connection 214a-214d indicated by the address bits 232 and 234. Further, select logic 202 asserts data connection exclusion signals 249-251, to affirm that a particular set of data connections was not selected. In this regard, stage 204-207 associated with the particular data connection 214a-214d uses such exclusion signal 249-251 to drive the data word 260-263 from the previous stage to the next stage, thereby excluding the data word associated with the current stage.

Generally, if circuit 200 is powered via power connection 290, then stage 204 transmits data word 260 to stage 205. Such transmission is clocked by clock signals 230 and 228, which is described in more detail with reference to FIG. 4. Each stage 205-207 thereafter selects from a data word 260-263 transmitted by the previous stage 204-206 and the data word 261-263 received via data connections 240-243. Stage 207 then transmits the final selected data word via connection 226 to the system bus 224. Summarily, each stage 205-207 following stage 204 receives a data word 261-263, a data connection select signal 246-248, and a data connection exclusion signal 249-251, and the signals 246-251 select the data word 261-263 that is to be propagated to the next stage.

For example, if address bits 234 and 232 indicate that the data word associated with data connection 214b is desired, then the select logic 202 asserts the select signal select_b 246, which is received by stage 205 of the DML 201, e.g., the stage associated with data connection 214b. Further, select logic 202 deasserts signals select_c 247 and select_d 248, which are received by stage 206 and stage 207, respectively. Select logic 202 also asserts select_abd 250 and select_abc 251, which are transmitted via connections 274 and 275 to stage 206 and stage 207. Further, select logic 202 deasserts data connection exclusion signals select_acd 249, which is transmitted via connection 273 to stage 205.

In such an example, stage 204 is driven by power source 290, and the data word 260 from the associated data connection 214a is transmitted, by stage 204, to stage 205. Stage 205 receives an asserted data connection selection signal select_b 246 and a deasserted data exclusion signal select_acd 249. In response, DML stage 205 disables throughput of data word 260 from stage 204 to stage 206, and, alternatively transmits data word 261 from the data connection 214b to stage 206. The signals received by stage 206 include data word 262 associated with data connection 214c, a deasserted data connection select signal select_c 247, and an asserted data connection exclusion signal select_abd 250. Thus, stage 206 enables transmission of the data word 261 associated with data connection 214b to be transmitted to stage 207. Likewise, in accordance with select signals received by select logic 202, stage 207 also enables transmission to the system bus data word 261 associated with data connection 214b as the selected data word via connection 226. Thus, DML 201 transmits, to the system bus 224, the data word associated with the data connection 214a-214d indicated by the address bits 234 and 232.

Note that the DML 201 further comprises clocks 280 and 281, which transmit clock signals 230 and 228. These clock signals 230 and 228 control the timing of the data connection selection effectuated by the DML 201. The DML 201 receives the data words 260-263 from the data connections 214a-214d and the select signals 246-251 from the select logic 202 and performs selection of the data words 260-263 in accordance with the cycles of the clock signals 230 and 228, as will be described in more detail hereinbelow.

As previously discussed herein, the select logic 202 may receive from application logic (not shown) address bit 234 and address bit 232. Address bits 234 and 232 exhibit values indicative of a particular data connection, i.e., 214a, 214b, 214c, and 214d. The following truth table illustrates exemplary address bit values and the data connection indicated by the particular address bit pairs. Note that a bit pair refers to the simultaneously received dual values of address bit 234 and address bit 232.

TABLE 1

| Address Bit 234 | Address Bit 232 | Data connection | | | |
|---|---|---|---|---|---|
| | | 214a | 214b | 214c | 214d |
| 1 | 1 | 1 | 0 | 0 | 0 |
| 1 | 0 | 0 | 1 | 0 | 0 |
| 0 | 1 | 0 | 0 | 1 | 0 |
| 0 | 0 | 0 | 0 | 0 | 1 |

With reference to Table 1, if the application (not shown) seeks data from data connection 214a, then, in accordance with the truth table, it asserts address bit 234 and address bit 232. If it seeks data from data connection 214b then it asserts address bit 234 and deasserts address bit 232. If it seeks data from data connection 214c then it deasserts address bit 234 and asserts address bit 232, and if it seeks data from data connection 214d it deasserts both address bits 234 and 237.

An exemplary, implementation of the select logic 202, is now described with reference to FIG. 3. In accordance with the following truth table the select logic 202 can be implemented with complementary metal semiconductor (CMOS):

TABLE 2

| CONNECTION DESIRED | select d 248 | select abc 251 | select b 246 | select acd 249 | select c 247 | select abd 250 |
|---|---|---|---|---|---|---|
| 214a | 0 | 1 | 0 | 1 | 0 | 1 |
| 214b | 0 | 1 | 1 | 0 | 0 | 1 |
| 214c | 0 | 1 | 0 | 1 | 1 | 0 |
| 214d | 1 | 0 | 0 | 1 | 0 | 1 |

Note that the select logic 202 transmits two types of "select signals," data connection selection signals 246-248 and data connection exclusion signals 249-251. A data connection selection signal 246-248 is asserted in accordance with the data connection 214a-214d indicated by the address bits 234 and 232. Thus, if the address bits 234 and 232 indicate selection of data connection 214d then select_d 248 (FIG. 2) is asserted. Further if address bits 234 and 232 indicate data connection 214c, then select_c 247 is asserted, and if they indicate data connection 214b, then select_b 246 is asserted.

Note that select signal select_a is not addressed in Table 2, and in the exemplary embodiment described hereafter, the select signal select_a is not needed. Other embodiments of select logic 202, however, may use such a select signal select_a. The reason for the omission of the select signal select_a from Table 2 is that as described herein, DML stage 204 does not require a select signal from select logic 202. This lack of requisition of a select signal is because stage 204 does not have a preceding stage from which it receives a data word 260-263. Therefore, as will become apparent by the following description, stage 204 does not need an indication from select logic 202 of whether to choose the data word from the preceding stage or the data word from the data connection 214a associated with stage 204.

Table 2 indicates assertion and deassertion by the select logic 202 of the select signals in order to select a particular data connection. For example, if data connection 214b is the desired connection, the data connection select signal select_b 246 (FIG. 2) is asserted, and the select signals select_d 248 and select_c 247 are deasserted. In addition, data connection exclusion signals select_abc 251 and select__abd 250 are asserted, and select_acd 249 is deasserted.

In addition to data connection select signals 246-248, select logic 202 also asserts and/or deasserts data connection exclusion signals 249-251. Exclusion signals 249-251 are also asserted and/or deasserted in accordance with the address bits received. However, the exclusion signals 249-251 identify which data connections are not being selected, i.e., which data connections are being excluded. For example, if the address bits 234 and 232 indicate that data connection 214d is sought, then in addition to asserting the select signal select_d 248, select_abc 251 is deasserted and transmitted to stage 207, which is associated with data connection 214d, and indicates that data connections 214a, 214b, 214c are excluded. Likewise, select_abd 250 and select_acd 249 are asserted indicating that data connection 214b is excluded and data connection 214c is excluded and transmitted to stage 205 and stage 206, respectively.

Figure 3:
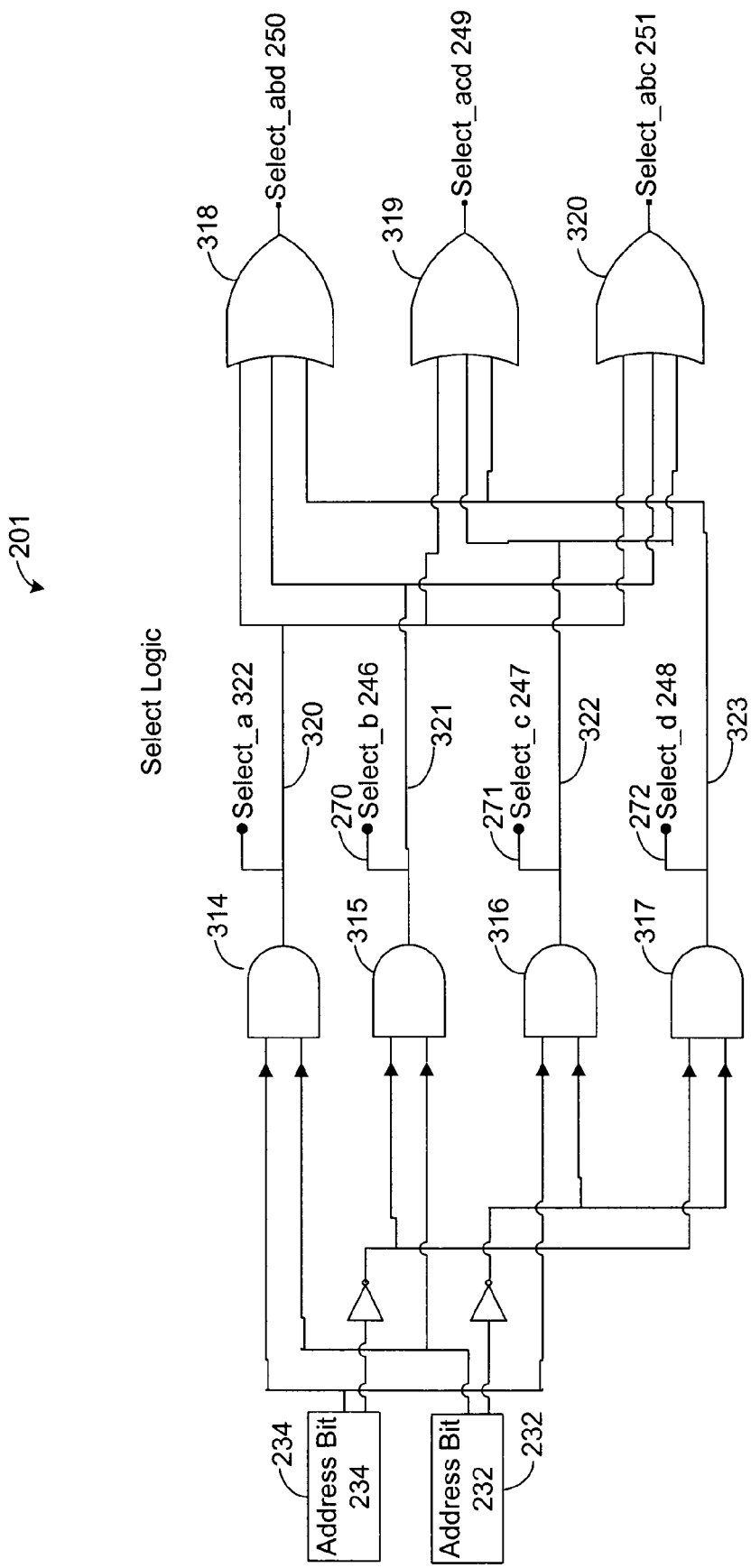
FIG. 3 is a block diagram illustrating an exemplary embodiment of select logic, such as is depicted in FIG. 1.

FIG. 3 illustrates an exemplary complementary metal oxide semiconductor (CMOS) implementation of the truth table of Table 2. Note that other implementations of the truth table in other various forms of hardware are possible in other embodiments. However, the embodiment of the select logic 202 in FIG. 3 comprises two inputs, i.e., two address bits 234 and 232. The select logic 201 further comprises a plurality of logical gates 314-317. The number of logical gates 314-317 preferably corresponds to the number of data connections 214a-214d (FIG. 2) in the distributed multiplexor circuit 200 (FIG. 2).

The exemplary implementation of select logic 202 of FIG. 3 comprises four exemplary logical AND gates 314-317, which transmits four data connection select signals select _a 322, select _b 246, select_c 247, and select_d 248 via connections 320-323 indicating which data connection is sought by an application. Further, select_b 246, select_c, 247, and select_d 248 are transmitted to DML 201 (FIG. 2) via connections 270-272.

In accordance with Table 1, the select logic 202 asserts select_a 322 when address bit 234 is asserted and address bit 232 is asserted, asserts select_b 246 when address bit 234 is asserted and address bit 252 is deasserted, asserts select_c 247 when address bit 234 is deasserted and address bit 232 is asserted, and asserts select_d 248 when address bit 254 is asserted and address bit 232 is asserted.

The select logic 202 transmits the data connection selection signals 246-251 via wires 270-272 to their corresponding stages 204-207. In this regard, select_b 246 is transmitted to stage 205, which is associated with data connection 214b. In addition, select_c 247 is transmitted to stage 206, which is associated with data connection 214c, and select_d 248 is transmitted to stage 207, which is associated with data connection 214d.

Moreover, select logic 202 uses the select signals transmitted from the plurality of AND gates 314-317 via connections 320-323 as input to a plurality of OR gates 318-320 for ascertaining the data connection exclusion signals 250-251 for the distributed multiplexor circuit 200 (FIG. 2). In the embodiment depicted in FIG. 3, three OR gates 318-320 are employed. Select logic 202 asserts data connection exclusion signal select_abd 250 when the select_c 247 is asserted via AND gate 318. In addition, the select logic 202 asserts the data connection exclusion signal select_acd 249 when the data connection select signal select_b 246 is asserted via AND gate 315. Finally, the select logic 202 asserts the data connection exclusion signal select_abc 251 when the data connection select signal select_d 248 is asserted via AND gate 317. Select logic 202 then transmits the data connection exclusion signals 249-251 to its corresponding DML stage (FIG. 2) 204-207.

As described above, select_abd 250, when asserted, indicates that data connections 214a, 214b and 214d are excluded (i.e., data connection 214c is requested), and select_acd 249, when asserted, indicates that data connection 214a, 214c and 214d are excluded (i.e., data connection 214b is requested). Further select_abc 251, when asserted, indicates that data connections 214a, 214b, and 214c are excluded, (i.e., data connection 214d is requested).

Figure 4:
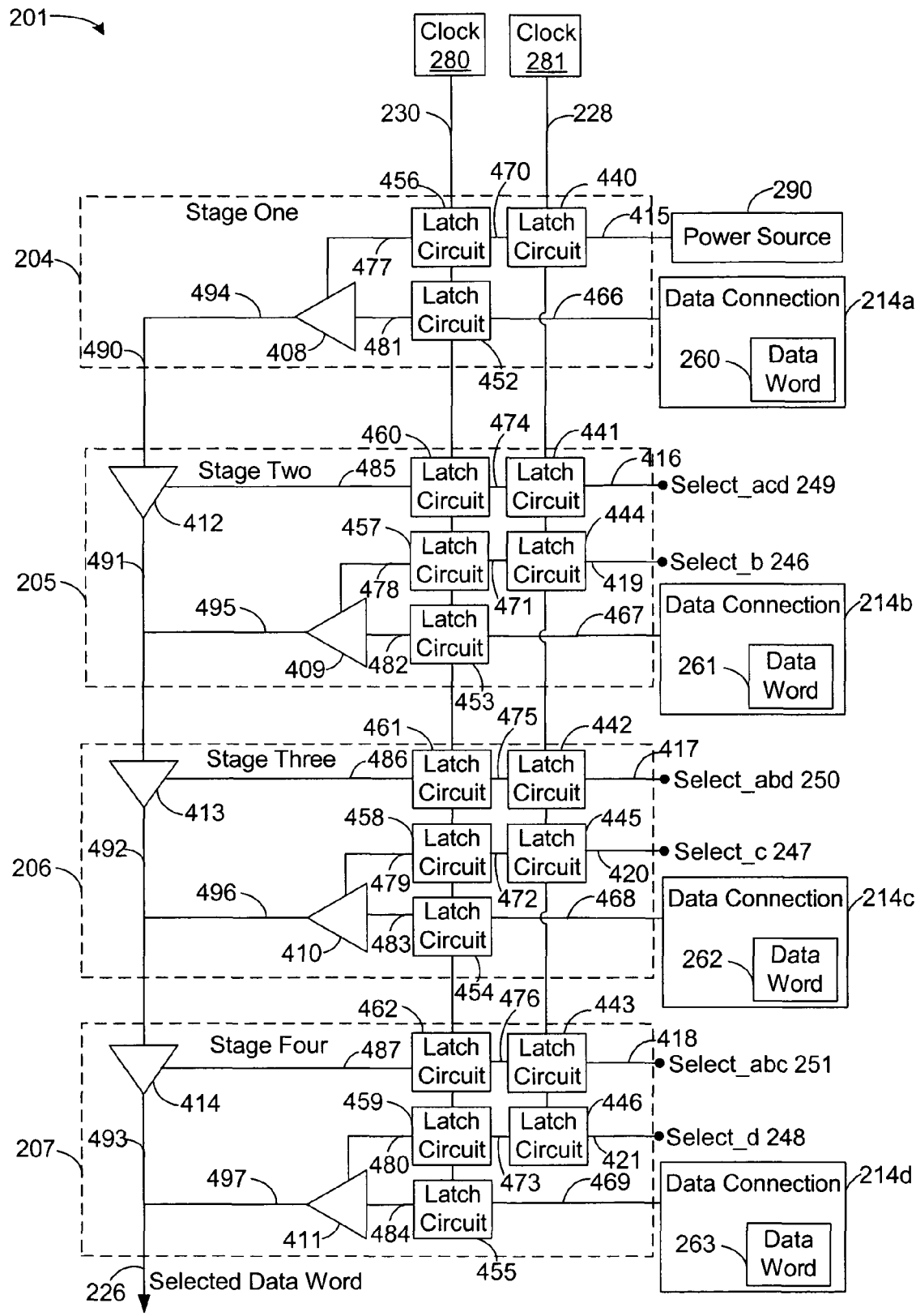
FIG. 4 is a block diagram illustrating an exemplary embodiment of stages 1 through 4 of distributed multiplexor logic, such as is depicted in FIG. 1.

FIG. 4 illustrates an exemplary implementation of the DML 201 of FIG. 2. Each DML stage 204-207, preferably comprises data connection selection tristate drivers 408-411, each of which receives and outputs its associated data word 260-263 to its associated connection 490-493, respectively, based upon select signals 246-251.

In addition to receiving its associated data word 260-263, each data connection selection tristate driver 408-411 also receives an enable signal, which is an output 477-480 from a latch circuit 456-459. Such output 477-480 drives the data connection selection tristate driver 408-411. In this regard, if the output 477-480 is asserted via the corresponding latch circuit 456-459 then the output 477-480 enables the data connection selection tristate driver 408-411 to which the output 477-480 is connected. If the data connection selection tristate driver 408-411 is enabled, then the data word 260-263 associated with the data connection selection tristate driver 408-411 drives its associated connection 490-493 via connection 494-497.

Each of stages 205-207 further comprises a data connection exclusion tristate driver 412-414, which is configured to receive the data word 260-262 that is driven to the previous stage's bus 490-492. Additionally, each data connection exclusion tristate driver 412-414 receives an enable signal, which is an output 485-487 of a latch circuit 460-462. Such output 485-487 drives the data connection exclusion tristate driver 412-414. If the output 485-487 is asserted via its corresponding latch circuit 460-462, then the output 485-487 enables the data connection exclusion tristate driver 412-414 to which the output 485-487 is connected. If the data connection exclusion tristate driver 412-414 is enabled, then the data word 260-263 currently driving the previous connection 490-492 drives the current connection 491-493.

Thus, each of the stages 205-207 effectively selects which signal drives its connection 491-493. If data connection selection tristate driver 408-411 is enabled, then the data word 260-263 of the data connection 214a-214d drives its associated connection 490-493. If the current stage's data connection exclusion tristate driver 412-414 is enabled, and thus the current stage's data connection selection tristate driver 408-411 is disabled, then the stage 205-207 selects the data word 260-263 currently driving the previous stage 204-206 to drive the current stage 205-207, respectively. Furthermore, whether data connection selection tristate drivers 408-411 are enabled or data connection exclusion tristate drivers 412-414 are enabled depends upon select signals 246-251.

The timing of the selection by the DML 201 of which data word 260-263 is transmitted to connections 490-493 and ultimately to the system bus 224 via connection 226 is controlled via clock signals 230 and 228 transmitted by clock 280 and clock 281.

Hence, the output 470-476 of each latch circuit 440-446 changes upon the detection of a leading edge of clock signal 228, and the value of the output 470-476 latched by the latch circuit 440-446 reflects the current value at the input 415-421 of the latch circuit 440-446 upon detection of the leading edge of the assertion of the clock signal 228. If during such assertion of the clock signal 228 the value at the input 415-421 changes, then such a change is reflected in the output 470-476. When the clock signal 228 is deasserted, the value currently at the input 415-421 is latched at the output 470-476 until another leading edge of clock signal 228 activates the latch 440-446.

Likewise, each output 477-487 of each latch circuit 452-462 changes upon the detection of a leading edge of clock signal 230, and the value of the input 466-476 is latched at the output 477-487 by the latch circuit 452-462 upon detection of the leading edge of the assertion of the clock signal 230. If during such assertion of the clock signal 230, the value at the input 466-476 changes, then such a change is reflected in the output 477-487. When the clock signal 230 is deasserted, the value currently at the output 477-487 is latched until the another leading edge of clock signal 230.

Therefore, during operation, each data connection 214a-214d preferably transmits a data word 260-263, which is present as input 466-469 at a corresponding latch circuit 452-455. Further, select logic 202 (FIG. 2) transmits to each of stages 205-207 a set of select signals including a data connection select signal 246-248 and a data connection exclusion signal 249-251. Each data connection select signal 246-248 is present as input 419-421 at the corresponding latch circuit 444-446, and each data connection exclusion signal 249-251 is present as input 416-418 at the corresponding latch circuit 441-443.

When clock signal 228 is asserted, the leading edge of the clock signal 228 triggers latch circuits 440-446. When the latch circuits 440-446 are triggered, the data presently at the inputs 415-421 are latched as the outputs 470-476. Thus, in stage 204, if power source 290 is providing a power signal, such value indicative of the power source 290 is latched by latch circuit 440 as output 470.

Figure 5:
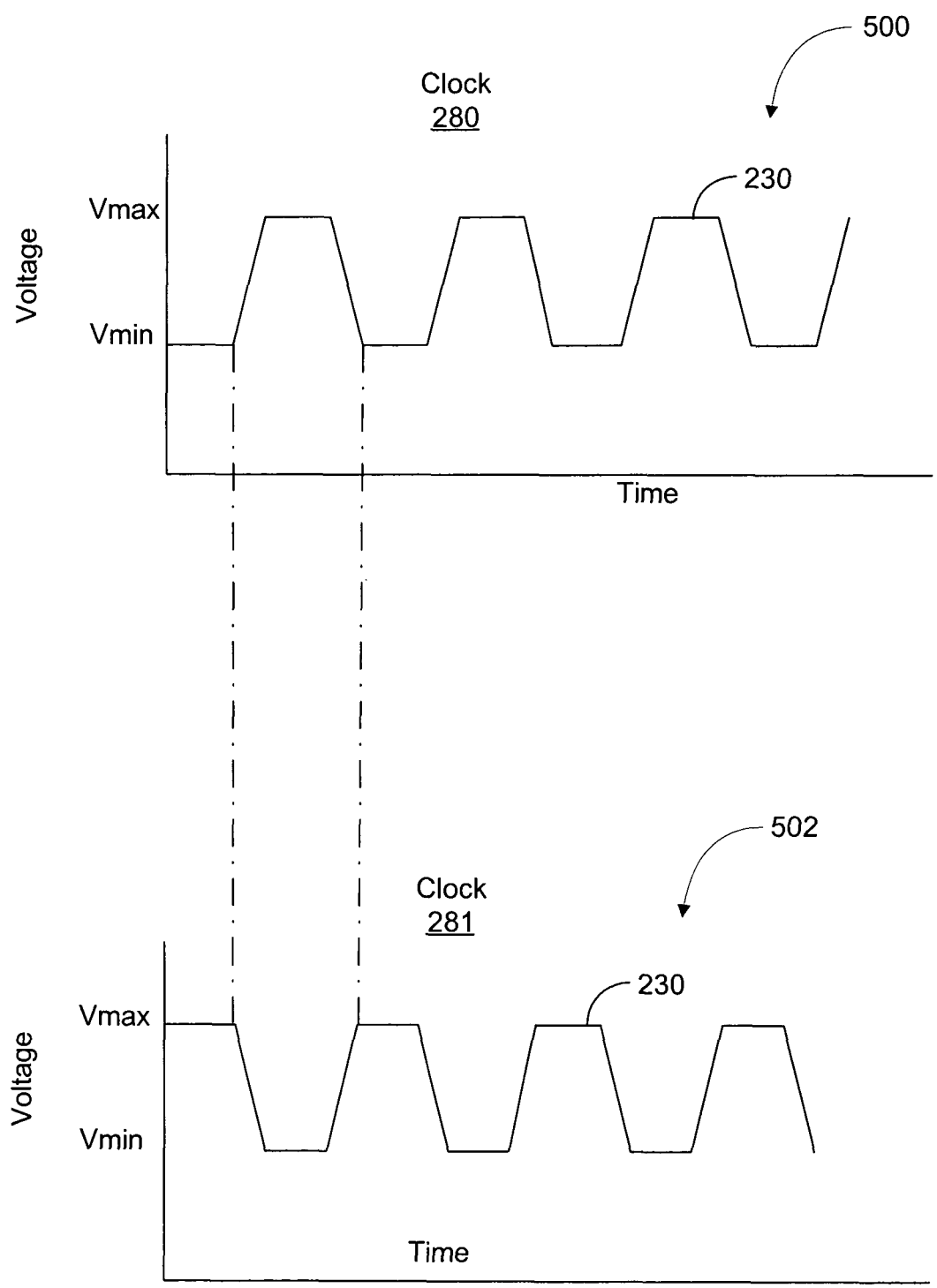
FIG. 5 is a timing diagram that illustrates the relative timing characteristics of an exemplary embodiment of distributed multiplexor logic, such as is depicted in FIG. 1.

Likewise, as will be described further herein with reference to FIG. 5, clock signals 228 and 230 preferably operate out-of-phase, such that when clock signal 228 is deasserted, then clock signal 230 is asserted, thereby triggering latch circuits 452-462. Therefore, the outputs 470-476 are latched by latch circuits 440-446 and remain latched to serve as inputs to latch circuits 452-462. When the leading edge of clock signal 230 triggers latch circuits 452-462, then those outputs 470-476 simultaneously are latched as the outputs 477-487. Thus, data connection selection tristate driver 408 is enabled by output 477, if power is being supplied to the DML 201, which results in data word 260 driving connection 490. Hence, data word 260 is present as input to data connection exclusion tristate driver 412.

Simultaneously therewith, the values of the select signals 246-251 are latched for each stage 205-207 and data words 260-264 are latched for each stage 204-207. Therefore, in accordance with the select signals 246-251 the data word 260-263 indicated by the select signals is transmitted as the selected data word via connection 226.

Specifically, if select_acd 249 is asserted, then the output 485 of latch circuit 460 when the clock signal 230 triggers latching the value of the asserted data connection exclusion signal select_acd 249 is asserted, thus enabling data connection exclusion tristate driver 412. If data connection exclusion tristate driver 412 is enabled, then data word 260 drives connection 491 of stage 205 via data connection exclusion tristate driver 412. The data connection exclusion tristate driver 412 further serves as a repeater when driving such data word 260 to the connection 491, and, therefore, increases the signal strength of the data word 260.

Alternatively, if select_acd 249 is deasserted, then the output 485 of latch circuit 460 is deasserted. Furthermore, in accordance with Table 2 hereinabove, if select_acd 249 is deasserted, then select_b is asserted, indicating that the data word 261 is desired. Therefore, the output 478 of latch circuit 457 is asserted, thus enabling data connection selection tristate driver 409. When data connection selection tristate driver 409 is enabled, then data word 261 from data connection 214b drives connection 491 via output 495.

Each stage 206-207 thereafter behaves in the manner described with reference to stage 205. For brevity, each stage will not be described further in detail. Note, however, that as each stage 205-207 performs selection between the data word associated with the stage and the data word driving the previous connection, that the final stage connection 493 is driven by the data word 260-263 selected by the select signals 246-251 received from select logic 201.

As indicated in FIG. 4, stage 204 does not receive a data word from a previous stage, nor does it receive select signals, for reasons discussed herein. Therefore, the data word 260 is driven to the connection 490 when power is supplied to DML 201. In this regard, the tristate driver 408 is enabled via latch circuits 456 and 440 from power source 290 via clock signals 230 and 228 from clocks 280 and 281, respectively.

Clocks 280 and 281 are preferably configured to operate at opposite phases. Consequently, when signal 230 of clock 280 is asserted, signal 228 of clock 281 is deasserted, and when signal 228 of clock 281 is asserted, signal 230 of clock 280 is deasserted. As illustrated in FIG. 5, diagram 500 illustrates a signal 230 for clock 280 operating at maximum voltage, e.g., being asserted. As indicated in diagram 502, when signal 230 is being asserted, signal 228 of clock 281 is deasserted, e.g., operating at minimum voltage. As shown, at each cycle clock 280 and 281 cycle to the opposing phase.

Therefore, when clock signal 228 is asserted, latch circuits 440-446 connected to clock 281 and controlled via clock signal 228 allow signals to propagate from the input of the latch circuits 440-446 to the outputs 470-476 of latch circuits 440-446. If inputs 415-421 of latch circuits 440-446 change any time that clock signal 228 of clock 281 is asserted, then it will be reflected in the output. When clock 281 is deasserted, the most recent value that is latched by latch circuits 440-446 will be held until the next cycle, e.g., until clock signal 228 is asserted again. Likewise, latch circuits 452-462 behave in the same manner in accordance with clock signal 230 from clock 280. In this regard, at the leading edge of clock signal 230 outputs 470-476 present at the input of latch circuits 452-462 are latched as outputs 477-487 of latch circuits 452-462.

The final stage 207 transmits a selected data word, which is one of the data words 260-263 to the system bus 224 (FIG. 2). Thus, the selected data word 260-263 is directly driven through the connections 490-493 of the DML 201 and transmitted as selected data word 226, which is selected via select signals 246-251 by select logic 202.

In propagating the data words 260-263 from the first stage to the final stage of the circuit 201, the tristate drivers 412-414 located between each stage 204-207 serve to increase the signal strength of the data word propagated from the previous stage, thereby acting as repeaters. These tristate drivers 412-414 therefore allow the data connections 214a-214d to be separated by a relatively long distance on an IC.

Note that it is preferable that the select signals 246-251, which are transmitted from select logic 202 for controlling the tristate drivers 408-411 and 412-414 all enable and disable the tristate drivers concurrently. The circuit 201 (FIG. 2) accomplishes concurrent enablement and disablement of the latch circuits 440-446 and latch circuits 452-462 and the timing thereof by clocks 280 and 281. Concurrent enablement and disablement of the tristate drivers 408-411 and 412-414 limit the amount of "drive fight," e.g., the time that more than one driver is attempting to drive a connection 490-493 to a different data word 260-263.

Figure 6:
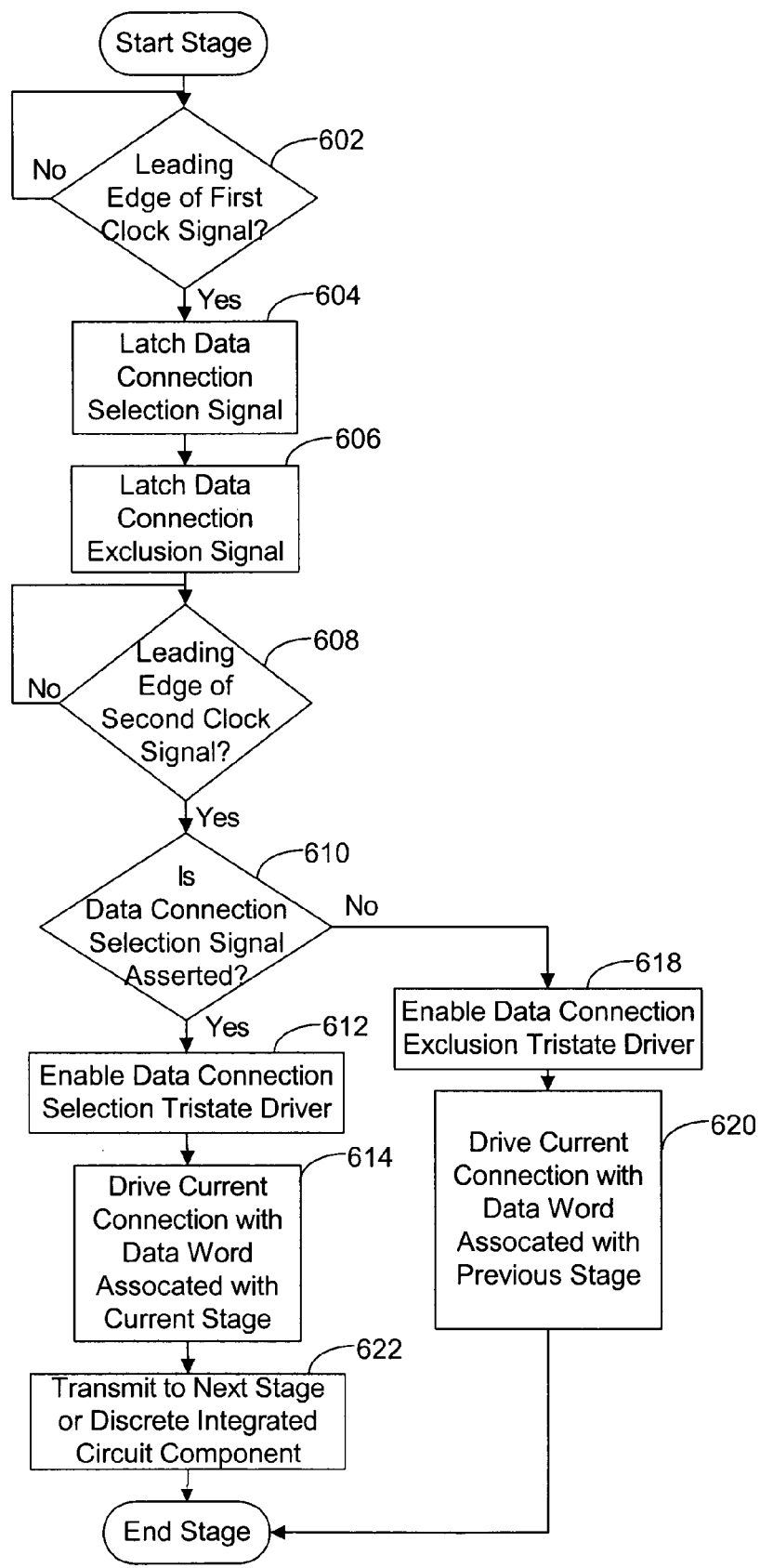
FIG. 6 is a flow chart illustrating an exemplary embodiment of architecture and functionality of the distributed multiplexor logic, such as is depicted in FIG. 1.

Operation of an exemplary architecture and functionality of a stage 205-207 of DML 201 is now discussed with reference to FIG. 6. As described and explained hereinabove, stage 204 preferably behaves somewhat differently than the remaining stages 205-207. Note that other embodiments of DML 201 may employ greater or fewer than the four stages 204-207 illustrated in the embodiment of DML 201 in FIG. 4.

An exemplary stage 205-207 preferably operates in accordance with clock signals 230 and 228 originating with clocks 280 and 281, respectively. The aforedescribed clock signals 230 and 228 preferably operate out of phase, e.g., when one such clock is asserted, the other one is deasserted.

A stage 205-207 latches a data connection selection signal, as indicated in step 604, and a data connection exclusion signal 606, as indicated in step 606, when a first clock signal is asserted, e.g., when a clock signal transitions from a minimum voltage value to a maximum voltage value, as indicated in step 602. Note that latching occurs, as described hereinabove, when a digital logic circuit that comprises a clock input, a data input, and a data output, is used to store one or more bits. Generally, when the clock input is asserted, then data on the input is exhibited and retained on the circuit output, e.g., the data is latched on the circuit's output. When the clock goes inactive, the data is retained on the circuit output until the clock goes active again.

When a second clock signal is asserted, as indicated in step 608, the latched values are used to effectuate selection of a data word. In this regard, if the data connection selection signal latched in step 604 is asserted, as indicated in step 610, then a data connection selection tristate driver 409-411 (FIG. 4) is enabled, as indicated in step 612.

Thus, the DML 201 (FIG. 4) transmits the data word associated with the current stage to the connection 491-493 (FIG. 4), as indicated in step 614, via the data connection selection tristate driver 409-411. By virtue of connecting the current connection 490-493 to either another connection 490-493 of another stage or by connecting the current connection 490-493 to a system bus, the next step is transmitting the selected data word 260-263 from the current stage. Transmission from the current stage can be to a next stage or to a system bus, as described herein and as indicated in step 622.

If the data connection selection signal is not asserted, then the data connection exclusion signal is asserted, which enables the data connection exclusion tristate driver 412-414, as indicated in step 618. Thus, the data word from the previous stage is transmitted to the current stage's connection 491-493 via the data connection exclusion tristate driver 412-414, as indicated in step 620, and the data word currently being driven to the connection 491-493 is transmitted either to a next stage or to the system bus, as indicated in step 622.

To further illustrate DML 201, if an application requests data word 262 from data connection 214c, select logic 201 (FIG. 2) asserts select_c 247 (FIG. 4), select_acd 249 (FIG. 4), and select_abc 251 (FIG. 4). Further in accordance with the application's request, select logic 201 deasserts select_b 246 (FIG. 4), select_abd 250 (FIG. 4), and select_d 248 (FIG. 4). Stage 204 (FIG. 4) receives a power signal and thus drives connection 490 (FIG. 4) with data word 260 (FIG. 4) from data connection 214a (FIG. 4).

Note that each stage 205-207, thereafter, by enablement or disablement of its associated data connection selection tristate drivers 409-411 and data connection exclusion tristate drivers 412-414 selects whether to drive its connection 491-494 with its associated data word 261-263 or the data word from the previous stage. Enablement and/or disablement of select tristate drivers 408-414 is effectuated by select signals 246-251 and in accordance with clock signals 228 and 230.

At the leading edge of clock signal 228 (FIG. 4), data connection selection signals select_b 246, select_c 247, and select_d 248 are latched, as indicated by decision step 602 and step 604. Select_b 246 is latched as output 471 (FIG. 4), select_c 247 is latched as output 472 (FIG. 4), and select_d is latched as output 473 (FIG. 4). Further, data connection exclusion signals select_acd 249, select_abd 250, and select_abc 251 are latched, as indicated by step 606.

When the first clock 281 cycles and deasserts its clock signal 228 and upon the leading edge of a second clock signal 230, the data connection exclusion tristate driver 412 is enabled in stage 205 by the output 485 from latch circuit 460, because the data connection exclusion signal select_acd 249 is asserted, as indicated by decision step 610 and step 618. Thus, the data word 260 drives the stage 205 connection 291, as indicated in step 620. Accordingly, select_b 246 disables tristate driver 409, thus allowing the connection 491 to be driven by the data word 260 from the previous stage 204.

Preferably contemporaneously, upon the leading edge of the same second clock signal 230, as indicated in step 608, and at stage 206, the data connection selection tristate driver 410 is enabled by the output 479 from latch circuit 458, because data connection selection signal select_c 247 is asserted, as indicated by decision step 610 and step 612. Thus, the data word 262 drives the stage 206 connection 292, as indicated in step 614. Accordingly, select_abd 250 is deasserted, thereby allowing the connection 492 to be driven by the data word 262 from the current stage 206.

Also preferably contemporaneously therewith, upon the leading edge of the same second clock signal 230, as indicated in step 608, and at stage 207, the data connection exclusion driver 414 is enabled by the output 487 from latch circuit 462, because the data connection exclusion signal select_abc 251 is asserted, as indicated in decision step 610 and step 618. Thus, the data word 262 drives the stage 207 connection 293, as indicated in step 620. Accordingly, select_d 248 disables tristate driver 411, thus allowing the connection 493 to be driven by the data word 262 from the previous stage 206, as indicated in step 622.

The finally selected data word, which in the example provided is data word 262, is then transmitted to a system bus 224 via a connection 226.

Note that similar designs can be made with any number of stages. Further note that if the distance and the number of stages increases beyond what can be done in a single timing iteration by clocks 280 and 281, the design can be spread across multiple timing iterations using a additional electronic components, e.g. latches, flip flops and/or other devices.

Figure 7:
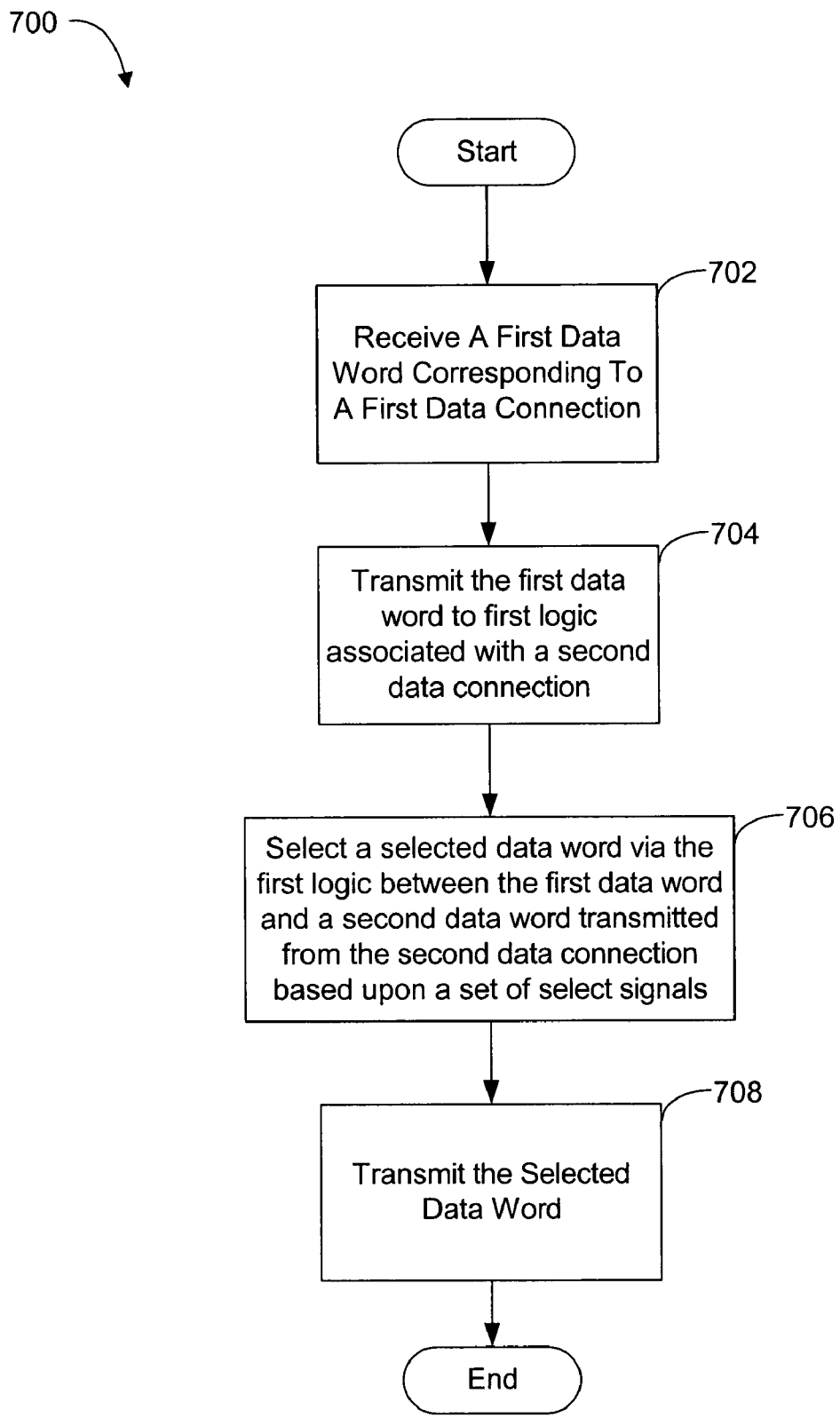
FIG. 7 is a flow chart illustrating an exemplary embodiment of architecture and functionality of the distributed multiplexor logic, such as is depicted in FIG. 2.

FIG. 7 describes generally a method 700, which illustrates an exemplary architecture and functionality of DML 201 (FIG. 2). As indicated in step 702, a DML stage 204 receives a first data word 260 corresponding to a first data connection 214a. DML stage 204 transmits the first data word 260 to first logic DML stage 205 associated with a second data connection 214b, as indicated in step 704.

DML stage 205 then proceeds to select a selected data word between the first data word 260 and a second data word 261 transmitted from the second data connection 214b based upon a set of select signals, as indicated in 706. As described herein DML stage 205 selects which data word to throughput to DML stage 206 in accordance with select signals select_acd 249 and select_b 246. DML logic stage 205 then transmits the selected data word, either data word 260 or data word 261, as indicated in step 708.

Now, therefore, the following is claimed:

1. A circuit for multiplexing a plurality of data words including a first data word and a second data word, comprising:
   a plurality of data connections;
   first stage logic having a first tristate driver, the first tristate driver configured to receive the first data word from one of the connections and to transmit the first data word received; and
   second stage logic configured to receive the first data word from the first stage logic and to receive the second data word from another of the plurality of data connections, the second stage logic configured to select for transmission one of the first data word and the second data word based upon a set of select signals, the second stage logic configured to transmit the data word selected for transmission by the second stage logic, the second stage logic having a connection, a second tristate driver, and a third tristate driver, the second tristate driver having an output electrically coupled to an output of the third tristate driver, the second tristate driver configured to receive the first data word from the first tristate driver and to drive the connection of the second stage logic with the first data word if the first data word is selected for transmission by the second stage logic, the third tristate driver configured to receive the second data word and to drive the connection of the second stage logic with the second data word if the second data word is selected for transmission by the second stage logic.

2. The circuit of claim 1, wherein the second stage logic is further configured to transmit, to a third stage logic, the data word selected for transmission by the second stage logic.

3. The circuit of claim 1, wherein the second stage logic is further configured to transmit, to a system bus, the data word selected for transmission by the second stage logic.

4. A multiplexor circuit, comprising:
   a plurality of data connections;
   first stage logic configured to receive a first data word from one of the connections and to transmit the first data word received based on a set of select signals; and
   second stage logic configured to receive the first data word from the first stage logic and to select a selected data word between the first data word and a second data word received from another of the plurality of data connections based upon a set of select signals, the second stage logic configured to transmit the selected data word to a third stage logic and to increase a signal strength of the first data word when the first data word is transmitted, if the first data word is selected.

5. A multiplexor circuit, comprising:
a plurality of data connections;
first stage logic configured to receive a first data word from one of the connections and to transmit the first data word received; and
second stage logic configured to receive the first data word from the first stage logic and to select a selected data word between the first data word and a second data word received from another of the plurality of data connections based upon a set of select signals, the second stage logic configured to transmit the selected data word to a third stage logic,
wherein the second stage logic comprises:
a first tristate driver configured to drive a connection with the first data word from the first stage logic, the first tristate driver enabled if a data connection exclusion signal is asserted and disabled if the data connection exclusion signal is deasserted; and
a second tristate driver configured to drive the connection with the second data word, the second tristate driver enabled if a data connection select signal is asserted and disabled if the data connection select signal is deasserted.

6. The circuit of claim 5 wherein the first tristate driver increases the signal strength of the first data word when the selected data word is the first data word.

7. The circuit of claim 5, further comprising:
a first latch circuit configured to receive the data connection exclusion signal, the first latch circuit configured to latch the value indicative of the data connection exclusion signal at an output of the first latch circuit, the output of the first latch circuit configured to enable the first tristate driver if the data connection exclusion signal is asserted;
a second latch circuit configured to receive the data connection selection signal, the second latch circuit configured to latch the value indicative of the data connection selection signal at an output of the second latch circuit, the output of the second latch circuit configured to enable the second tristate driver if the data connection selection signal is asserted;
a third latch circuit configured to receive the second data word, the third latch circuit configured to latch the second data word at an output of the third latch circuit, the output of the third latch circuit configured for receipt by the second tristate driver;
a first clock configured to transmit a clock signal to the first, second, and third latch circuits, the clock signal activating latching of the second data word, the data connection selection signal and the data connection exclusion signal at the outputs of the third, second and first latch circuits, respectively.

8. A circuit comprising
a plurality of data connections;
logic associated with a first data connection of the plurality of data connections, the logic associated with the first data connection configured to transmit a first data word corresponding to the first data connection;
logic associated with a second data connection of the plurality of data connections configured to receive the first data word corresponding to the first data connection from the logic associated with the first of the plurality of data connections, the logic associated with the second data connection configured to select a first selected data word between the first data word and a second data word corresponding to the second data connection based upon a set of select signals; and
logic associated with a third data connection of the plurality of data connections configured to receive the first selected signal set, the logic associated with the third data connection configured to select a second selected data word between the first data word and a third data word corresponding to the third data connection based upon a set of select signals, the logic associated with the third data connection further configured transmit the second selected data word to a system bus.

9. A multiplexor circuit, comprising:
a first tristate driver comprising a first data input, a first data output, and a first enable input, the first tristate driver adapted to receive a first data word via the first data input representative of a first data connection;
a second tristate driver comprising a second data input, a second data output, and a second enable input, the second tristate driver adapted to receive a second data word representative of a second data connection;
a third tristate driver having an output coupled to the first data input of the first tristate driver; and
a connection adapted to receive, via the data output of the first tristate driver, the first data word, if a first signal is asserted at the first enable input of the first tristate driver, the connection further adapted to receive, via the second data output of the second tristate driver, the second data word, if a second signal is asserted at the enable input of the second tristate driver.

10. The multiplexor circuit of claim 9, further comprising select logic configured to assert the first signal if an application program desires the first data word representative of the first data connection and configured to assert the second signal if the application program desires the second data word representative of the second data connection.

11. The multiplexor circuit of claim 10, wherein the select logic deasserts the first signal if the application program does not desire the first data word and deasserts the second signal if the application program does not desire the second data word.

12. The multiplexor circuit of claim 11, wherein the first signal and the second signal enable and disable the first and second tristate drivers simultaneously.

13. The multiplexor circuit of claim 12, further comprising:
a first latch circuit configured to transmit the first signal to the first tristate driver upon a leading edge of a clock signal; and
a second latch circuit configured to transmit the second signal to the second tristate driver upon the leading edge of the clock signal.

14. A method for distributing multiplexing, comprising:
transmitting a first data word from a first tristate driver to a second tristate driver;
receiving a second data word; and
selecting for transmission between the first data word and the second data word based upon a set of select signals;
driving a first connection with the first data word via the second tristate driver if the first data word is selected by the selecting; and
driving the first connection with the second data word via a third tristate driver if the second data word is selected by the selecting.

15. The method of claim 14, wherein the selected data word is transmitted to a discrete integrated circuit (IC) component.

16. The method of claim 15, wherein the select signals comprise a data connection selection signal indicative of which data word is to be selected and a data connection exclusion signal indicative of which data word is to be excluded.

17. A method for distributing multiplexing, comprising:
receiving a first data word corresponding to a first data connection;
transmitting, via a tristate driver, the first data word to first logic associated with a second data connection;
selecting a selected data word via the first logic between the first data word and a second data word transmitted from the second data connection based upon a set of select signals; and
transmitting the selected data word,
wherein the selecting comprises:
driving the second data word to a connection via a first tristate driver if the data connection selection signal is asserted; and
disabling a second tristate driver configured to receive the first data word and configured to drive the first data word to the connection if the data connection exclusion signal is asserted.

18. The method of claim 17, wherein the selecting step further comprises:
driving the first data word to the connection via the second tristate driver if the data connection exclusion signal is asserted; and
disabling the first tristate driver if the data connection selection signal is deasserted.

19. The method of claim 18, wherein the driving the first data word to the connection further comprises increasing signal strength of the first data word.

20. The circuit of claim 1, wherein the plurality of data words includes a third data word, the circuit further comprising third stage logic configured to receive the third data word and the data word selected for transmission by the second stage logic, the third stage logic configured to select for transmission one of the third data word and the data word selected for transmission by the second stage logic based on a set of select signals, the third stage logic having a connection, a fourth tristate driver, and a fifth tristate driver, the fourth tristate driver having an output electrically coupled to an output of the fifth tristate driver, the fourth tristate driver configured to receive the data word selected for transmission by the second stage logic and to drive the connection of the third stage logic with the data word selected for transmission by the second stage logic if the data word selected for transmission by the second stage logic is selected for transmission by the third stage logic, the fifth tristate driver configured to receive the third data word and to drive the connection of the third stage logic with the third data word if the third data word is selected for transmission by the third stage logic.

21. The method of claim 14, further comprising:
receiving at a fourth tristate driver the data word selected by the selecting;
selecting for transmission between the received data word and a third data word based upon a set of select signals;
driving a second connection with the received data word via the fourth tristate driver if the received data word is selected by the selecting for transmission between the received data word and the third data word; and
driving the second connection with the third data word if the third data word is selected by the selecting for transmission between the received data word and the third data word.

* * * * *

UNITED STATES PATENT AND TRADEMARK OFFICE
CERTIFICATE OF CORRECTION

PATENT NO. : 7,349,448 B2 Page 1 of 1
APPLICATION NO. : 10/632885
DATED : March 25, 2008
INVENTOR(S) : Edward Chang It is certified that error appears in the above-identified patent and that said Letters Patent is hereby corrected as shown below:

On the face page, in field (56), under "Foreign Patent Documents", in column 2, line 4, delete "GB    1483903    9/1974".

Signed and Sealed this

Fourteenth Day of April, 2009

JOHN DOLL
*Acting Director of the United States Patent and Trademark Office*